(12) United States Patent
Karmarkar et al.

(10) Patent No.: US 12,454,176 B1
(45) Date of Patent: Oct. 28, 2025

(54) SYSTEMS FOR A DUAL MOTOR POWERTRAIN

(71) Applicant: DANA ITALIA S.R.L., Trentino (IT)

(72) Inventors: Sudatta Karmarkar, Pune (IN); Idris Poonawala, Pune (IN); Pradip Jasud, Pune (IN)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/645,932

(22) Filed: Apr. 25, 2024

(51) Int. Cl.
*B60K 1/02* (2006.01)
*B60K 17/02* (2006.01)
*B60K 17/04* (2006.01)

(52) U.S. Cl.
CPC ............. *B60K 17/046* (2013.01); *B60K 1/02* (2013.01); *B60K 17/02* (2013.01)

(58) Field of Classification Search
CPC ........ B60K 1/02; B60K 17/02; B60K 17/046; F16H 3/72
See application file for complete search history.

(56) References Cited

U.S. PATENT DOCUMENTS

| | | | |
|---|---|---|---|
| 9,580,065 B2 | 2/2017 | Bangura et al. | |
| 11,365,785 B2* | 6/2022 | Kumar | B60K 17/04 |
| 2009/0275436 A1* | 11/2009 | Kersting | B60K 6/26 |
| | | | 903/910 |
| 2011/0070992 A1* | 3/2011 | Si | B60K 6/547 |
| | | | 475/284 |
| 2017/0182884 A1* | 6/2017 | Jeong | B60K 1/02 |
| 2022/0290742 A1 | 9/2022 | Bachmann | |

FOREIGN PATENT DOCUMENTS

| | | | |
|---|---|---|---|
| CN | 217259542 U | * | 8/2022 |
| CN | 115030997 A | | 9/2022 |
| CN | 116587823 A | | 8/2023 |

* cited by examiner

*Primary Examiner* — Edwin A Young
(74) *Attorney, Agent, or Firm* — McCoy Russell LLP

(57) ABSTRACT

An electric driveline includes a planetary gear set comprising a ring gear, a sun gear, a planet carrier coupled to the ring gear and the sun gear, a first motor including a first output shaft coupled to the ring gear, a second motor including a second output shaft coupled to the sun gear, and a controller with instructions stored in memory thereof that when executed cause the controller to adjust an operational state of the first motor and selectively couple the ring gear to a static housing via a clutch based on a speed of the planet carrier.

18 Claims, 10 Drawing Sheets

| Sr No | Vehicle working conditions | Gross vehicle Weight, Ton | Electric Motor 1 | Electric Motor 2 | Motor working condition | Clutch | Remark |
|---|---|---|---|---|---|---|---|
| 1 | Empty | 70 | OFF | ON | Single motor | Close | High Energy saving |
| | | | ON | ON | Dual motor | Open | No energy saving |
| 2 | Low load (25 Ton) | 95 | OFF | ON | Single motor | Close | High Energy saving |
| | | | ON | ON | Dual motor | Open | No energy saving |
| 3 | Medium load (25 Ton) | 100 | ON | ON | Dual motor | Open | No energy saving |
| 4 | High load (45 Ton) | 115 | ON | ON | Dual motor | Open | No energy saving |

FIG. 4

SYSTEMS FOR A DUAL MOTOR POWERTRAIN

FIELD

The present description relates generally to a dual motor electric driveline of a vehicle.

BACKGROUND AND SUMMARY

Vehicle systems may size a motor to meet power demands. However, a single large motor may be inefficient during certain operating conditions. As such, some vehicle systems may include two smaller motors.

These vehicle systems may include complex gear systems and/or control strategies for operating the motors, which may increase vehicle manufacturing costs and complexity. Thus, there may be a demand for systems and methods different than those already available.

The issues described above may be addressed by an electric driveline including a planetary gear set comprising a ring gear, a sun gear, a planet carrier coupled to a differential, a first motor coupled to the ring gear, a second motor coupled to the sun gear, and a controller configured to adjust an operational state of the first motor and selectively couple the ring gear to a static housing via a clutch based on a speed of the planet carrier. In this way, operation of the motors may be achieved with a compact driveline.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4 shows a table indicating operation of a clutch and driveline components during different working conditions.

DETAILED DESCRIPTION

The following description relates to systems for a driveline including two electric motors. The inclusion of two electric motors of lower power, instead of single motor of higher power, may provide energy optimization and overall cost reduction. The two motors may consume less energy in a low load or empty vehicle travel condition as a result of motor efficiency optimization. Increase of motor and electronic hardware component life as one motor is made off in low load conditions. Vehicle travel range increases for a respective fully charged battery. Vehicles can still be in use at lower performance if one of the motor or electronic hardware is nonfunctional in case of breakdown. Generic design can be used for all types of vehicles.

Figure 1:
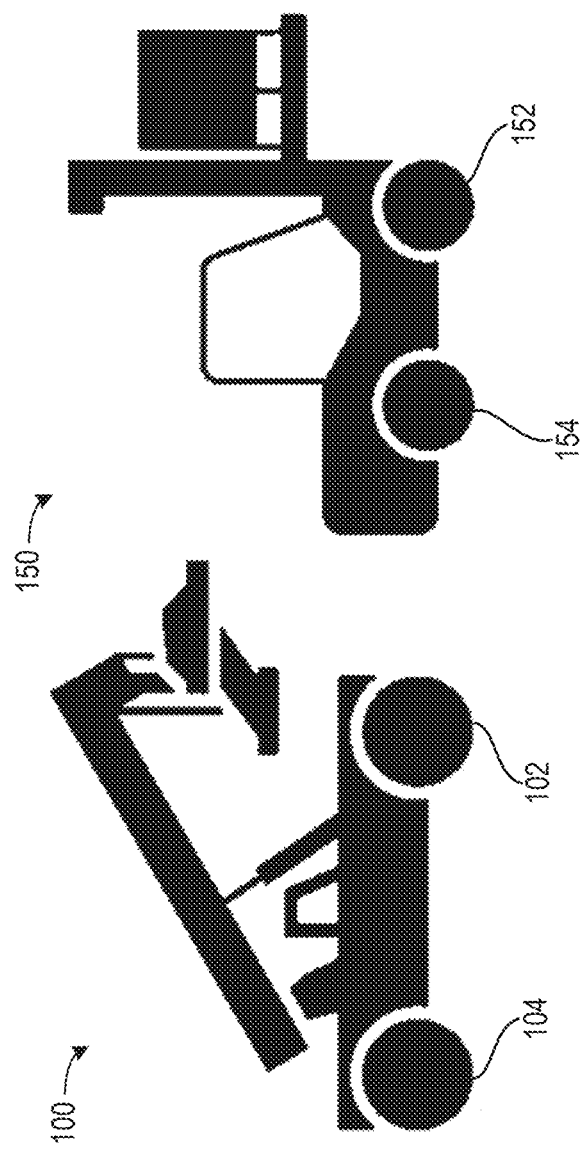
FIG. 1 shows example vehicle systems.
Figure 2:
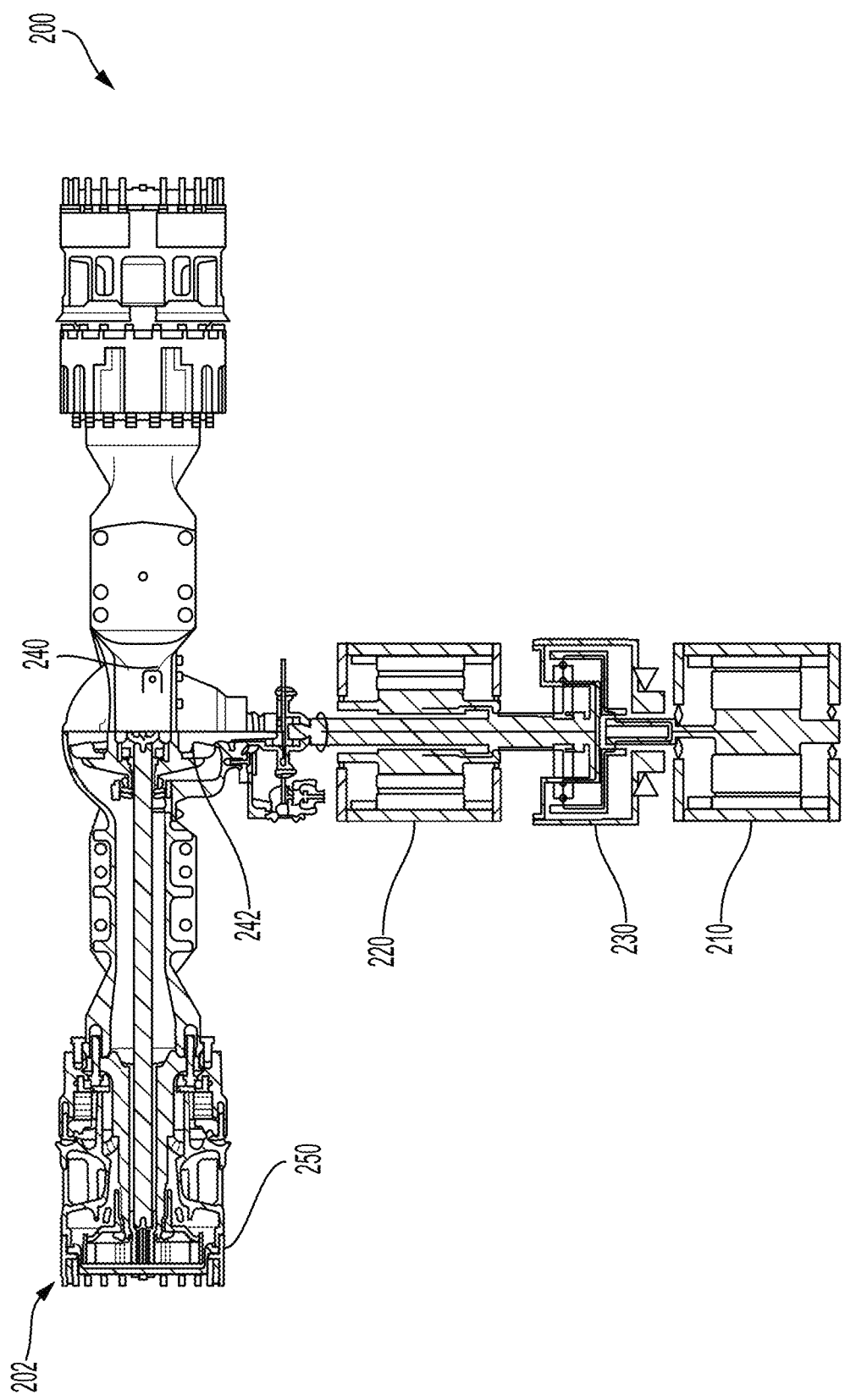
FIG. 2 shows a cross-section of a driveline used in the vehicle systems.
Figure 3:
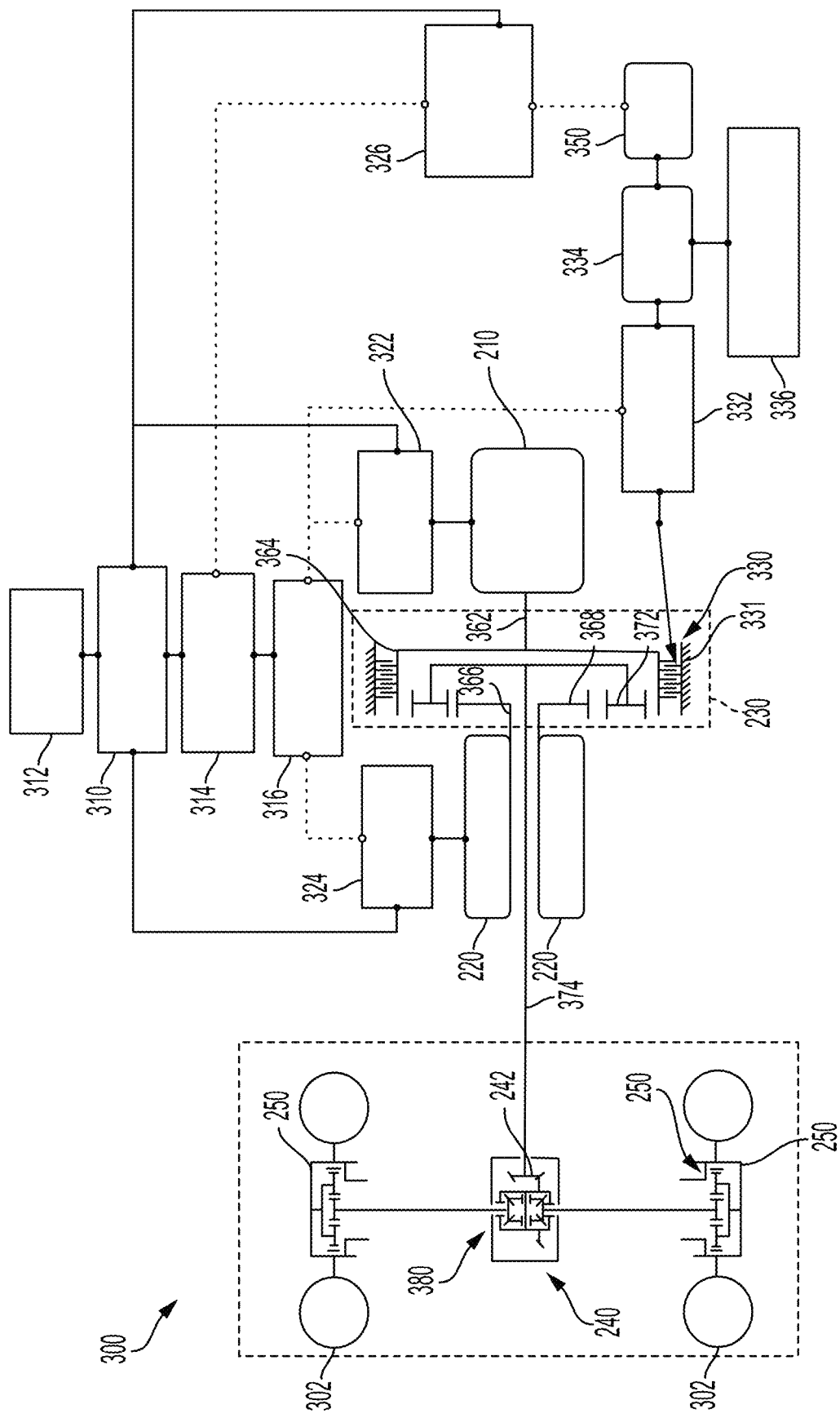
FIG. 3 shows a schematic of the driveline.
Figure 5:
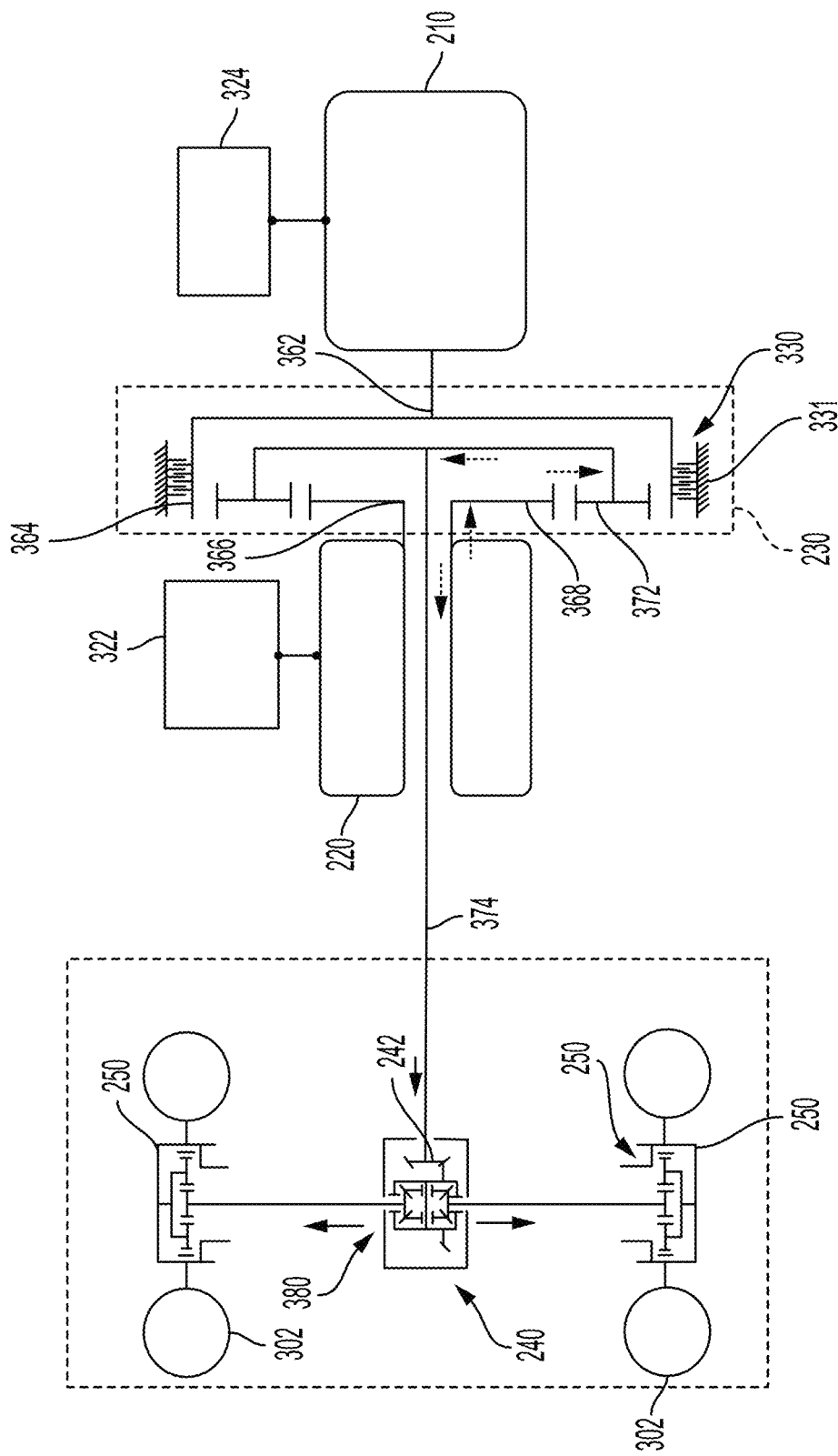
FIG. 5 shows a power flow during a first working condition with only one electric motor operating.
Figure 6:
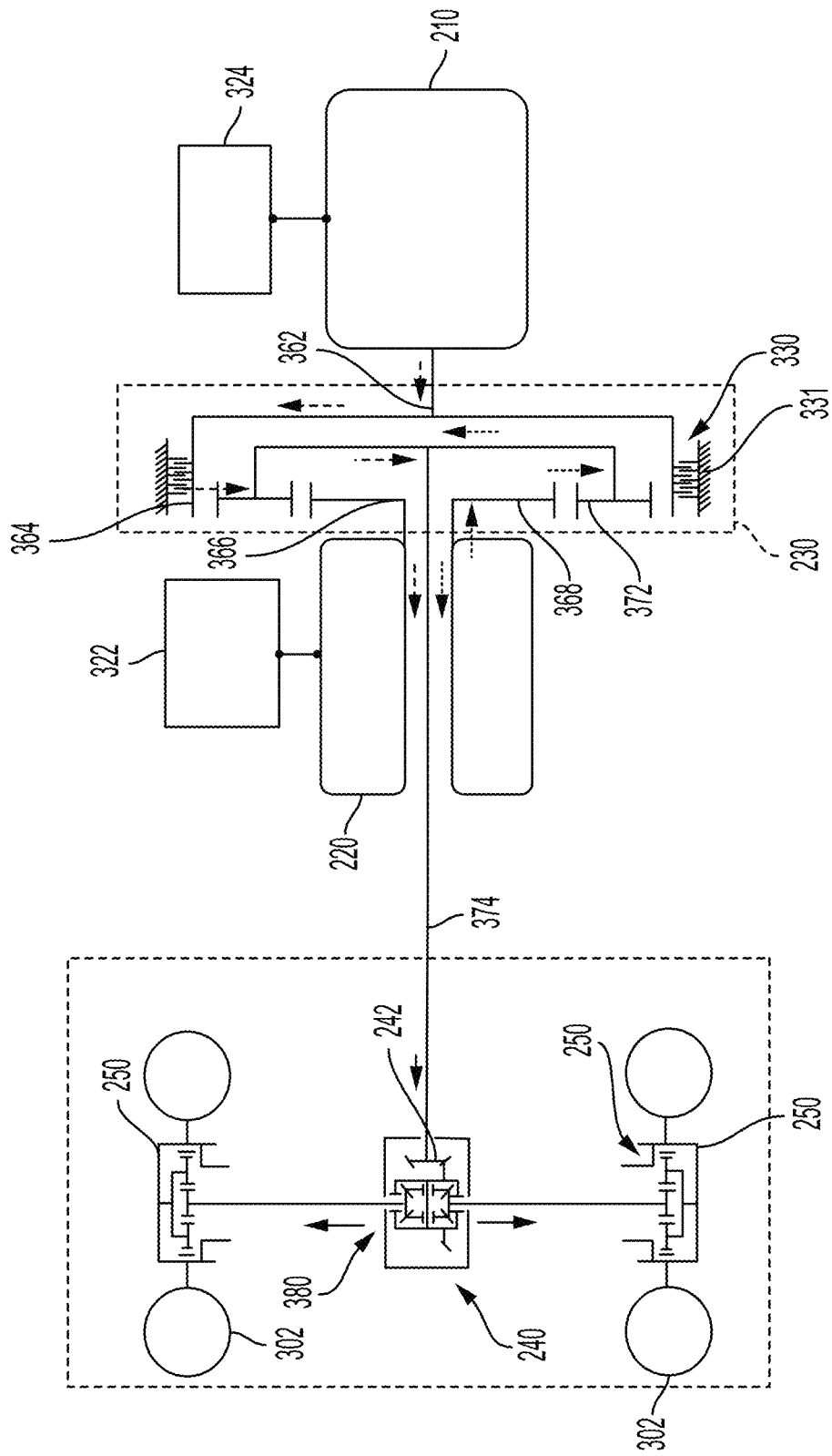
FIG. 6 shows a power flow during a second working condition with both electric motors operating.
Figure 7:
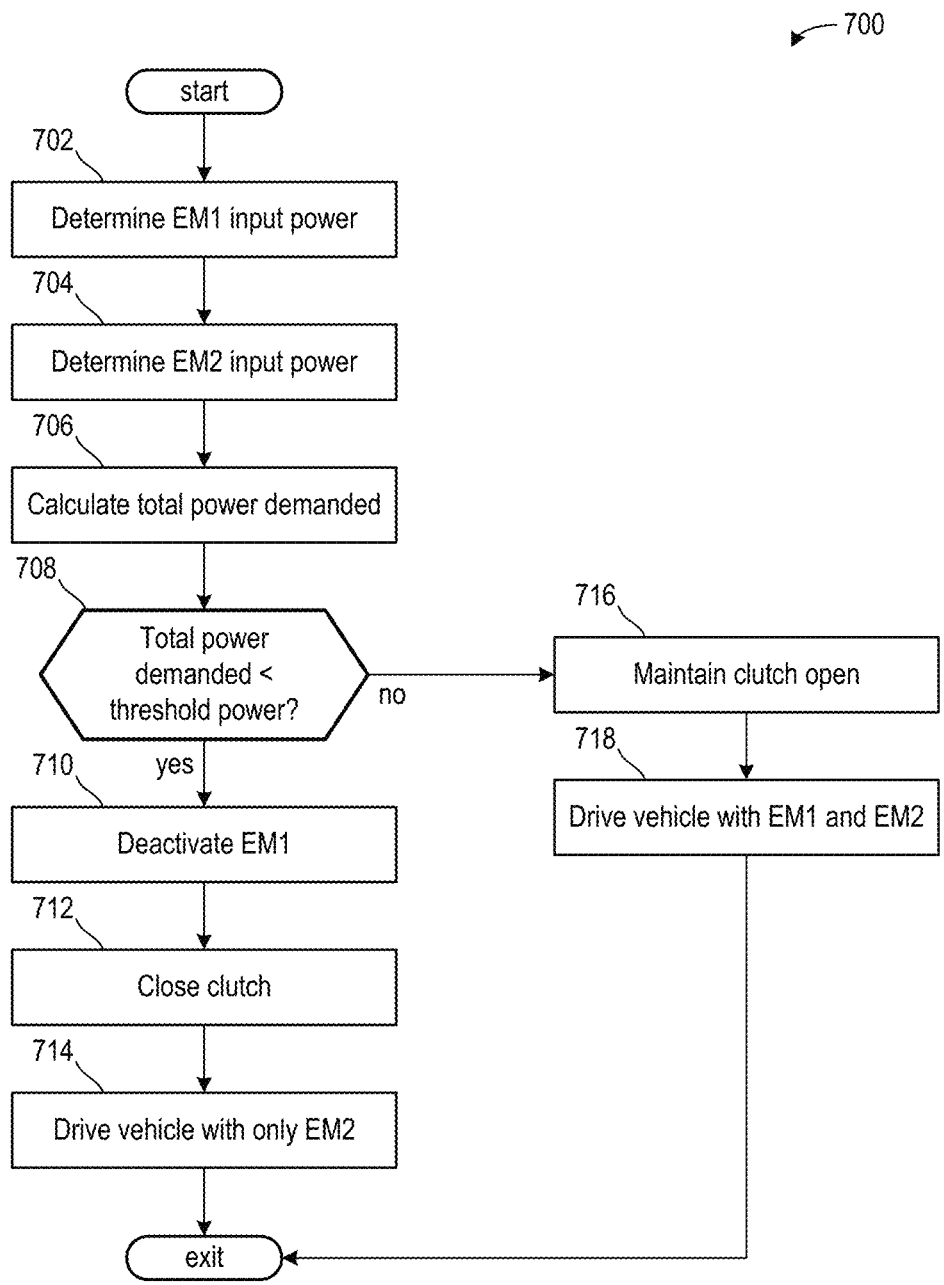
FIG. 7 shows a method for determining a working condition of the vehicle.
Figure 8:
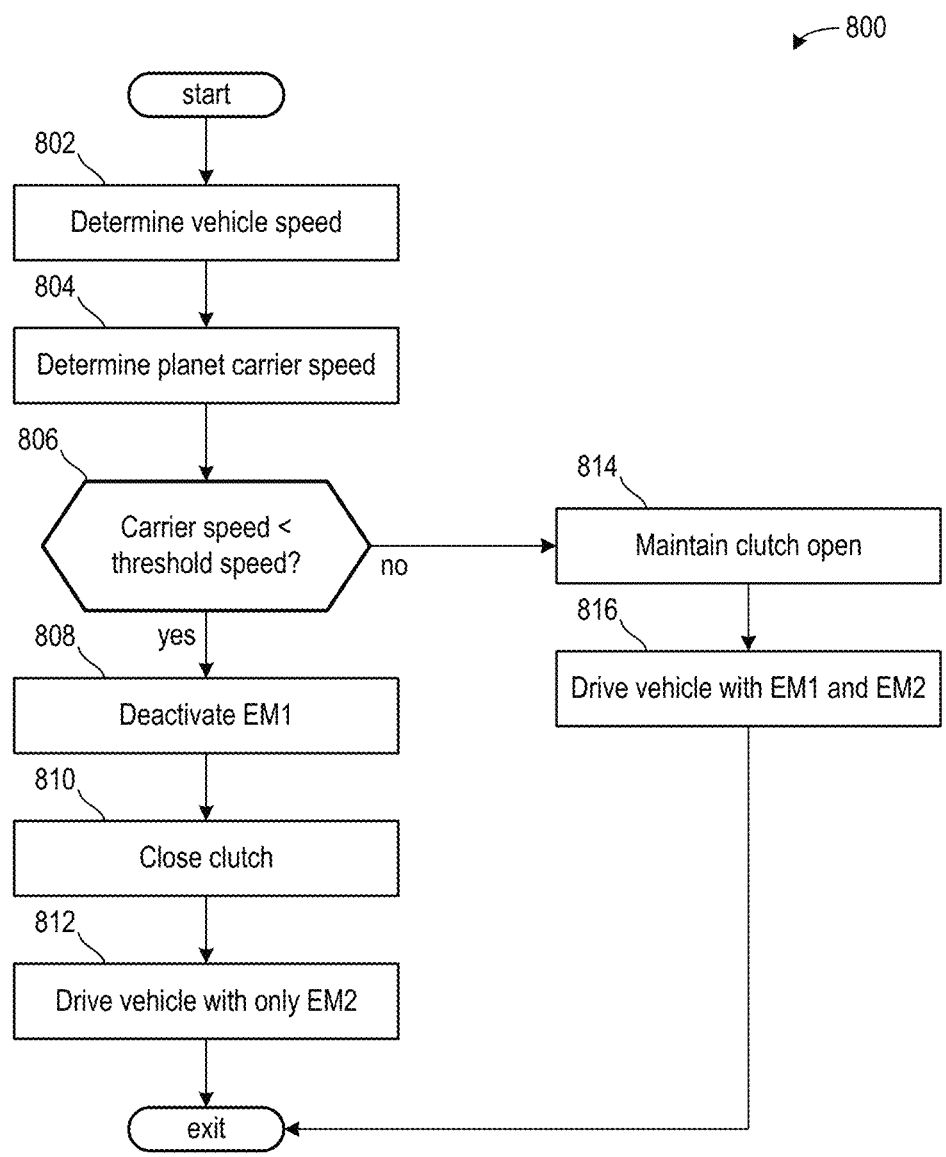
FIG. 8 shows a method for operating the electric motors based on a carrier speed.
Figure 9:
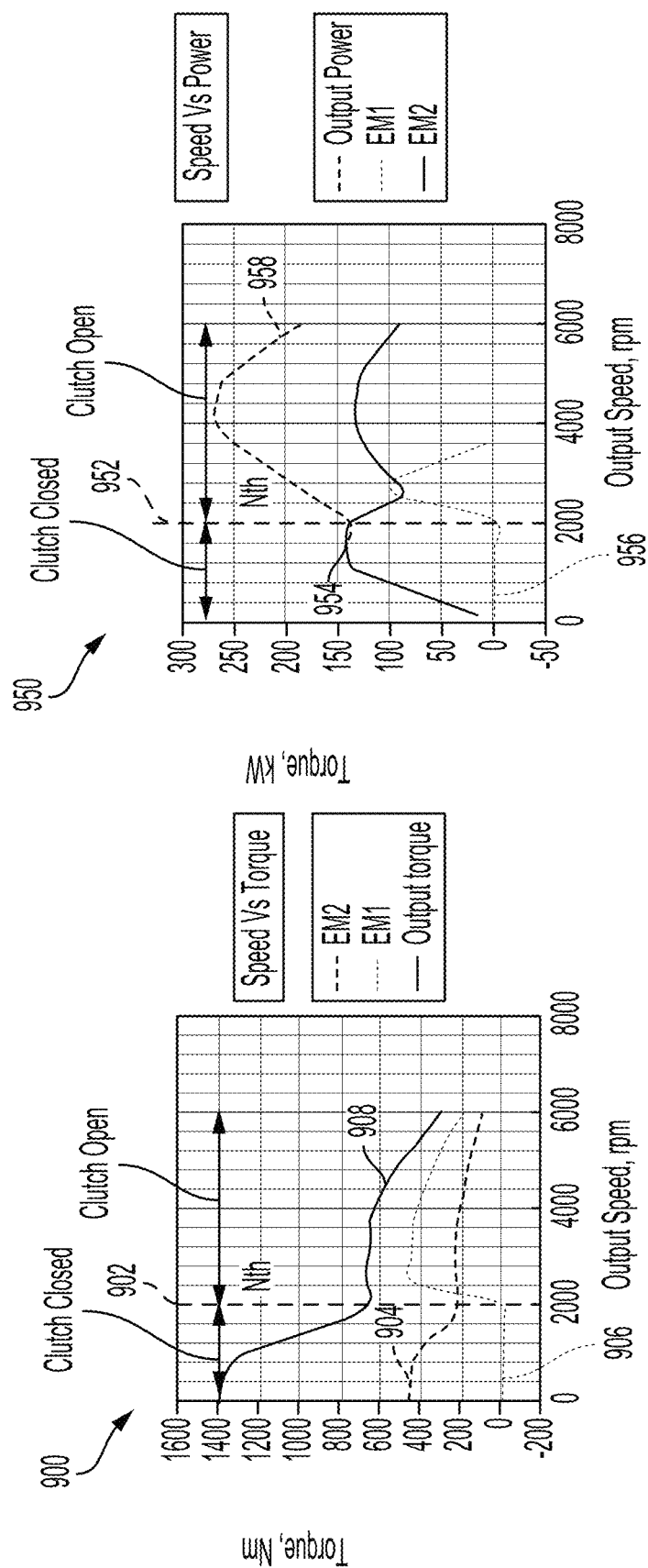
FIG. 9 shows plots illustrating a cut-off speed to change a drive mode from only one motor or both motors based on a comparison of power and speed or torque and speed.
Figure 10:
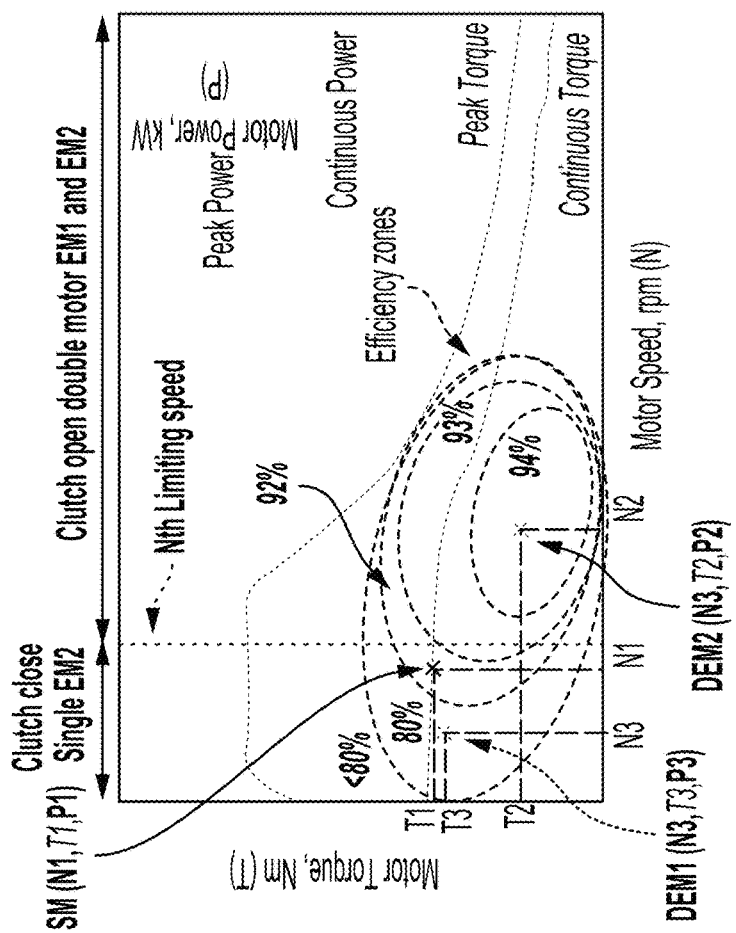
FIG. 10 shows an increased efficiency of the present driveline compared to previous example driveline operations.

FIG. 1 shows example vehicle systems. FIG. 2 shows a cross-section of a driveline used in the vehicle systems. FIG. 3 shows a schematic of the driveline. FIG. 4 shows a table indicating operation of a clutch and driveline components during different working conditions. FIG. 5 shows a power flow during a first working condition with only one electric motor operating. FIG. 6 shows a power flow during a second working condition with both electric motors operating. FIG. 7 shows a method for determining a working condition of the vehicle. FIG. 8 shows a method for operating the electric motors based on a carrier speed. FIG. 9 shows plots illustrating a cut-off speed to change a drive mode from only one motor or both motors based on a comparison of power and speed or torque and speed. FIG. 10 shows an increased efficiency of the present driveline compared to previous example driveline operations.

Turning now to FIG. 1, it shows a reach stacker 100 and a heavy forklift truck 150. The reach stacker 100 and the heavy forklift truck 150 may include an electric driveline coupled to a front axle of the front wheel 102 or front wheel 152, respectively. The rear axle is a steer axle and is coupled to rear wheel 104 of the reach stacker 100 or to rear wheel 154 of the heavy forklift truck 150. The example vehicles of FIG. 1 may not emit any gases like carbon dioxide ($CO_2$) carbon monoxide (CO), or nitrogen oxides ($NO_x$) and may be referred to as zero-emission vehicles. The reach stacker 100 and the heavy forklift truck 150 illustrate two non-limiting example vehicles that may be used with the driveline described below.

Turning now to FIG. 2, it shows a cross section 200 of an electrified front drive axle driveline 202 including a first electric motor 210, a second electric motor 220, an intermediate planetary system (IPS) 230, and a drive axle 240. The IPS 230 may combine power from the first electric motor 210 and the second electric motor 220 and transfer the combined power to an input of the drive axle 240. In one example, the input of the drive axle 240 may be a spiral bevel pinion gear pair 242. The IPS 230 may be configured as a power mixer to control power to the drive axle 240 from the first electric motor 210 and/or the second electric motor 220, in one example. The drive axle 240 may include the spiral bevel gear pair 242 and a secondary planetary system 250. Power from the IPS 230 is transferred from spiral bevel pinion gear pair 242, to secondary planetary system 250, and then to wheels, such as front wheel 102 or front wheel 152 of FIG. 1.

The first and second electric motors 210, 220 and IPS 230 may be mounted on a vehicle chassis. The output from the IPS 230 may be transferred to an input pinion of the spiral bevel pinion gear pair 242 either directly by a dedicated connection or a drive shaft depending upon type of vehicle, type of application, and space available on vehicle chassis.

Turning now to FIG. 3, it shows a schematic diagram of electric vehicle powertrain 300. The electric vehicle powertrain may include a battery management system 310, high voltage battery 312, vehicle controller (VC) 314, driveline controller (DC) 316, a first motor controller (MC1) 322, a second motor controller (MC2) 324, the first electric motor (EM1) 210, the second electric motor (EM2) 220, the IPS 230, clutch system 330, clutch actuating hydraulic system 332, and the drive axle 240.

The high voltage battery 312 may be a primary power source configured to supply power to electric motors EM1 210, EM2 220, and a third electric motor (EM3) 350 through respective motor controllers MC1 322, MC2 324, and MC3 326. The MCs may include an inverter configured to control power output from the high voltage battery 312 to the electric motors. A battery management system (BMS) may be included for enhanced operation of battery and blocks the batteries from deep discharge and over-voltage, which are results of extremely fast charge and extreme high discharge current.

The VC 314 may receive various inputs from an operator related to vehicle functioning (such as speed change requests via pedal actuation) and sends signals to driveline controller (DC) 316. Some functions of the VC 314 may include velocity changes, forward travel, reverse travel, motor optimization, lift material, turning, and stopping of the vehicle. DC 316 may control power input to motor controllers MC1 322 and MC2 324. MC1 322 and MC2 324 may control the speed and direction of rotation of the electric motors based on input from DC 316 which results in forward, reverse travel, and optimization of both the motors.

Vehicle controller (VC) 314 controls power input to the third motor controller (MC3) 326. MC3 326 may control the speed and direction of rotation of EM3 350 based on input from VC 314. EM3 326 may control a hydraulic pump 334. The hydraulic pump 334 may provide pressurized hydraulic fluid to a clutch actuating hydraulic system 332 and to other power units 336 dependent on pressurized hydraulic fluid. The clutch actuating hydraulic system 332 may be coupled to a clutch 330, the clutch coupled to the ring gear 364. The clutch 330 may be configured to engage and disengage the ring gear 364 from a stationary housing 331.

Electric motors (EM1, EM2 and EM3) may convert electrical energy into mechanical energy and transfer power to each power unit like drive axle, hydraulic systems of clutch, lift system, brake, and steering. The drive axle 240 may transfer power to wheels 302. The IPS 230 is positioned between EM1 210 and EM2 220. The IPS 230 may control and optimize the power of both the EM1 210 and the EM2 220. The EM1 210 may include a first output shaft 362 that transfers its power to a ring gear 364 of the IPS 230. The EM2 220 may include a second output shaft 366 that transfers its power to a sun gear 368 of IPS 230. The IPS 230 may mix power from EM1 210 and EM2 220 via a planet carrier 372 coupled to each of the ring gear 364 and the sun gear 368. A third output shaft 374 that is concentric with and extends through the body of the second output shaft 366, may transfer power from the IPS 230 to a differential unit 380 including the input gear (e.g., the spiral bevel pinion gear pair 242). In this way, the second output shaft 366 of EM2 220 is hollow. The third output shaft 374 may be splined with the input gear of the differential unit 380.

In some examples, additionally or alternatively, the third output shaft 374 and bevel pinion of drive axle 240 may be connected with a flexible coupling in vehicle embodiments including shocks. The differential unit 380 may transfer power to both second stage planetary gear systems 250 through separate axle shafts of the drive axle 240. Power from the second stage planetary gear systems 250 is transferred to wheels 302 through wheel hubs.

One or more of the VC 314, the DC 316, the MC1 322, the MC2 324, and the MC3 326 may include memory with instructions stored thereon that cause the controller to send signals to actuators and adjust operating parameters of the driveline. One or more sensors and actuators may be coupled to the controller(s) and in communication therewith such that the controller(s) may adjust the one or more actuators in response to feedback from the one or more sensors.

FIG. 4 shows a table 400 illustrating four working conditions of a vehicle, such as a forklift. A first condition is an empty condition (e.g., no load), a second condition is a low load condition, a third condition is a medium load condition, and a fourth condition is a high load condition. The gross vehicle weight changes for each load condition. Table 400 shows generic values of weight for example purposes and may be modified for different application types.

The first condition (e.g., the empty condition) may be a minimum of all load cases, so power demands of the vehicle are lower compared to all other load cases. The low power demand of the vehicle is detected by DC (e.g., DC 316 of FIG. 3), when MC1 (e.g., MC1 322 of FIG. 3) and MC2 (e.g., MC2 324 of FIG. 3) transfer less power to motors EM1 (e.g., EM1 210 of FIG. 3) and EM2 (e.g., EM2 220 of FIG. 3). DC may send a signal to a solenoid of clutch operating hydraulic system (e.g., the clutch actuating hydraulic system 332 of FIG. 3) to close the clutch. Additionally, the EM1 may be switched off via MC1. EM2 may continue operating and providing power to the IPS (e.g., IPS 230 of FIG. 3). The clutch (e.g., clutch 330 of FIG. 3) is mounted on the ring gear (e.g., ring gear 364 of FIG. 3) of the IPS, so the ring gear no longer rotates and power transfer between EM1 and the IPS is blocked. During the first condition, the IPS may function as a reduction gear system with input power to sun gear (e.g., sun gear 368 of FIG. 3) and output power from planet carrier (e.g., planet carrier 372 of FIG. 3). In this case, the IPS may be used to increase torque. Power flow of the first condition is shown in FIG. 5 via arrows. A method executed based on instructions stored in memory of the DC is shown in FIG. 7.

A vehicle load and relative power consumptions of the electric motors may be calibrated empirically via testing vehicles under various load conditions. A threshold power may be determined based on system temperatures, component durability limits, electric motor limits, drive system gearing, and the like. The DC may be configured to control clutch operation based on the threshold power, wherein the threshold power set corresponds to a power output from a single electric motor. If a power demand is less than the threshold power, then the second electric motor may be activated and the first electric motor may be deactivated and the clutch closed. This may result in an energy efficient operation of the first condition, which may reduce motor efficiency losses, allowing low operating costs, smooth speed, operation over a required range, and little to no vibrations. The first condition is also applicable to low load working conditions if the power requirement of vehicle is less than the threshold power, as shown with the second condition in table 400. During some operating conditions, while operating with the empty load or low load conditions, the speed of the vehicle may be higher, which results in an increase in power above the threshold power. In response, the clutch is opened, the first electric motor is activated, and the IPS delivers a mix of power from the first and second electric motors to a differential unit (e.g., differential unit 380 of FIG. 3). Such an example is described in further detail with respect to FIGS. 8 and 9 and their corresponding descriptions.

In one example, these working conditions may provide vehicle travel range increases for a respective fully charged battery. Additionally, the vehicle can still be in use if one of motor or electronic hardware is inactive. The assembly of the present disclosure may be used for all types of vehicles.

If high-power demand of the vehicle, which is detected by the DC, is greater than the threshold power, then MC1 and MC2 transfer relatively high power to motors EM1 and EM2 compared to the energy efficient operation. The DC may also determine the speed and torque of motor. The DC may provide signals to a solenoid of the clutch operating hydraulic system to open the clutch and MC1 to activate EM1. The ring gear of the IPS is free to rotate with the first output shaft and power from EM1 is transferred to the IPS. DC controls torque, speed, and power of both EM1 and EM2 in such a way that both the motors will work in higher efficiency zones relatively to only one electric motor operating. Power flow when operating each of the EM1 and EM2 is shown in FIGS. 5 and 6 via arrows.

As shown in FIG. 5, only the EM2 is active. Power from the EM2 220 transfers from the second output shaft 366, to the sun gear 368, to the planet carrier 372, and to the third output shaft 374 toward the differential unit 380. EM1 210 is inactive and the clutch 330 is closed, thereby blocking rotation of the ring gear 364.

As shown in FIG. 6, the EM2 and EM1 are active. Power transfer from the EM2 220 is identical to that described above with respect to FIG. 5. Power from the EM1 210 transfers from the first output shaft 362, to the ring gear 364, to the planet carrier 372, and to the third output shaft 374 toward the differential unit 380. In this way, the IPS 230 blends power from the EM1 210 and the EM2 220.

Turning now to FIG. 7, it shows a method 700 for adjusting motor operation based on a power demand. The power demand may be based on a driver demand. Instructions for carrying out method 700 and the rest of the methods included herein may be executed by a controller (e.g., DC) based on instructions stored on a memory of the controller and in conjunction with signals received from sensors (e.g., MCs) of the drive line system. The controller may employ actuators of the drive line system to adjust electric motor operation, according to the methods described below.

At 702, the method 700 may include determining the EM1 input power. The MC1 may provide feedback to the DC regarding power electrical energy being provided to the EM1.

At 704, the method 700 may include determining the EM2 input power. The MC2 may provide feedback to the DC regarding power electrical energy being provided to the EM2.

At 706, the method 700 may include calculating total power demanded. Total power demanded may be based on a vehicle load and pedal position.

At 708, the method 700 may include determining if total power demanded is less than the threshold power. The threshold power is based on a non-zero positive number. The threshold power may be based on a power output of a single electric motor.

If the total power demanded is less than the threshold power, then at 710, the method 700 may include deactivating the EM1.

At 712, the method 700 may include closing the clutch. As such, the ring gear may be decoupled from the planet carrier.

At 714, the method 700 may include driving the vehicle with only the EM2.

Returning to 708, if the total power is not less than the threshold power, then at 716, the method 700 may include maintaining the clutch open. As such, the ring gear may be coupled to the planet carrier.

At 718, the method 700 may include driving the vehicle with EM1 and EM2. As such, the IPS may blend power from the EM1 and EM2 and provide the blended power to the drive axle.

Turning now to FIG. 8, it shows a method 800 for operating the clutch based on a planet carrier speed. At 802, the method 800 may include determining a vehicle speed.

At 804, the method 800 may include determining a planet carrier speed. The planet carrier speed may be directly determined by a sensor. Additionally or alternatively, the planet carrier speed may be indirectly determined based on a power output for the EM1 and the EM2.

At 806, the method 800 may include determining if the planet carrier speed is less than a threshold speed. The threshold speed may be based on a non-zero, positive number. The threshold speed is equal to 2,000 rotations per minute, in one example. Additionally or alternatively, the threshold speed may be based on a planet carrier speed above which operation of both the EM1 and the EM2 is more efficient than operation of only the EM2. In one example, the threshold planet carrier speed is determined based on vehicle type, application and traction performance demands.

If the planet carrier speed is less than the threshold speed, then at 808, the method 800 may include deactivating the EM1.

At 810, the method 800 may include closing the clutch. As such, the ring gear may be decoupled from the planet carrier.

At 812, the method 800 may include driving the vehicle with only the EM2.

Returning to 806, if the planet carrier speed is not less than the threshold speed, then at 814, the method 800 may include maintaining the clutch open. As such, the ring gear may be coupled to the planet carrier.

At 816, the method 800 may include driving the vehicle with EM1 and EM2. As such, the IPS may blend power from the EM1 and EM2 and provide the blended power to the drive axle.

In this way, in one example, method 800 shows if the carrier speed is less than the threshold speed, the hydraulic clutch closes and one electric motor (EM1) is stopped as ring gear is fixed to housing, which is static. The other electric motor (EM2) will drive the carrier through sun to carrier connection. If carrier speed is increased above the threshold speed, hydraulic clutch opens, and both the electric motors (EM1 and EM2) are connected to carrier through sun to carrier and ring to carrier connection, and carrier is connected to input pinion of drive axle.

FIG. 9 shows a first graph 900 which illustrates the cut-off speed (e.g., the threshold speed) to change the mode of drive in relation to torque. FIG. 9 shows a second graph 950 which illustrates the threshold speed to change the mode of drive in relation to power. The drive line system may be evaluated for power against speed (e.g., second graph 950) as well as torque against speed (e.g., first graph 900). The graphs are divided into two zones one with clutch closed (only single motor runs) and other with clutch open (dual Motor runs). At the threshold speed 902 of the first graph 900 and the threshold speed 952 of the second graph 950, second motor (EM2) shows a downward trend in power as well as torque (line 904 and line 954, respectively) where clutch opens, and first motor (EM1) is engaged in the power flow as shown by line 906 and line 956, respectively. In the clutch open zone at speeds greater than the threshold speed, the output power and the output torque may be a summation of torque and power of both the motors. Output torque is shown via line 908 in the first graph 900 and output power is shown by line

958 in the second graph 950. The threshold speed may change according to vehicle characteristics as well as motor characteristics.

FIG. 10 shows a prior art example including a motor torque speed power characteristics plot. If the motors are operating under the continuous torque zone, then the motors will deliver power with higher efficiency. Typical motor efficiency zones are marked by dotted elliptical shapes. Efficiency values provided are illustrative and may be modified based on different motor configurations and applications. Efficiency zones of the prior art are an irregular contour shape, but are shown in elliptical shapes for pictorial understanding and explanation. DEM1 (N3, T3, P3) & DEM2 (N2, T2, P2) are typical working points when both the motors are working during an empty load condition. These points are in 94% and 80% efficiency zone, meaning power loss of 6% and 20%, respectively. In the prior art examples, additional power loss occurs due to the clutch being open, resulting in the clutch plates, the ring gear, the EM1 motor shaft, and all bearings related to these parts rotating, which leads to frictional losses that contribute to the additional power loss.

FIG. 2 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIG. 2 is shown approximately to scale.

The disclosure also provides support for an electric driveline comprising: a planetary gear set comprising a ring gear, a sun gear, and a planet carrier coupled to the ring gear and the sun gear, a first motor comprising a first output shaft coupled to the ring gear, a second motor comprising a second output shaft coupled to the sun gear, and a controller with instructions stored in memory thereof that when executed cause the controller to adjust an operational state of the first motor and selectively couple the ring gear to a static housing via a clutch based on a speed of the planet carrier. In a first example of the system, a third output shaft is coupled to the planet carrier and to a gear of a drive axle. In a second example of the system, optionally including the first example, the third output shaft extends through the second output shaft. In a third example of the system, optionally including one or both of the first and second examples, the planetary gear set is interposed between the first motor and the second motor. In a fourth example of the system, optionally including one or more or each of the first through third examples, the first motor is an electric motor and the second motor is an electric motor. In a fifth example of the system, optionally including one or more or each of the first through fourth examples, the instructions cause the controller to deactivate the first motor and close the clutch when the speed of the planet carrier is less than a threshold speed. In a sixth example of the system, optionally including one or more or each of the first through fifth examples, only the second motor supplies power to the planetary gear set. In a seventh example of the system, optionally including one or more or each of the first through sixth examples, the instructions cause the controller to maintain the first motor and the second motor active and open the clutch when the speed of the planet carrier is greater than a threshold speed. In an eighth example of the system, optionally including one or more or each of the first through seventh examples, the planetary gear set blends power from the first motor and the second motor and supplies the blended power to a drive axle.

The disclosure also provides support for a system, comprising: an intermediate planetary system (IPS) arranged between a first electric motor and a second electric motor, wherein a ring gear of the IPS is coupled to a first output shaft of the first electric motor and a sun gear of the IPS is coupled to a second output shaft of the second electric motor, and a clutch configured to couple the ring gear to a housing of the IPS. In a first example of the system, the system further comprises: a planetary carrier is coupled to each of the sun gear and the ring gear. In a second example of the system, optionally including the first example, the second output shaft is hollow, and wherein a third output shaft of the IPS extends through and is concentric with the second output shaft. In a third example of the system, optionally including one or both of the first and second examples, the housing is stationary. In a fourth example of the system, optionally including one or more or each of the first through third examples, the system further comprises: a controller configured to determine a total power demanded based on input power of the first electric motor and the second electric motor, and adjust operation of the first electric motor, the second electric motor, and the clutch in response to a comparison of the total power demanded to a threshold power. In a fifth example of the system, optionally including one or more or each of the first through fourth examples, the system further comprises: a third electric motor configured to power a pump of a hydraulic system coupled to the clutch.

The disclosure also provides support for a system for an electric powertrain, comprising: a first electric motor comprising a first output shaft, a second electric motor comprising a second output shaft, a planetary gear set arranged between the first electric motor and the second electric motor, the planetary gear set comprising a ring gear coupled to the first output shaft, a sun gear coupled to the second output shaft, and a planetary carrier coupled to the ring gear and the sun gear, and a clutch configured to control a coupling between the ring gear and a stationary housing of the planetary gear set. In a first example of the system, the system further comprises: a controller configured to control a closing and opening of the clutch in response to a comparison of a speed of the planetary carrier to a threshold speed. In a second example of the system, optionally including the first example, the controller is further configured to open the clutch in response to the speed of the planetary carrier being greater than the threshold speed, and close the clutch in response to the speed of the planetary carrier being less than the threshold speed. In a third example of the system, optionally including one or both of the first and second examples, the second output shaft is hollow, and wherein a third output shaft is coupled to the planetary carrier and extends through the second output shaft toward a drive axle. In a fourth example of the system, optionally including one or more or each of the first through third examples, the clutch is coupled to a hydraulic system pressurized by a pump driven by a third electric motor.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric driveline comprising:
a planetary gear set comprising a ring gear, a sun gear, and a planet carrier coupled to the ring gear and the sun gear;
a first motor comprising a first output shaft coupled to the ring gear;
a second motor comprising a second output shaft coupled to the sun gear; and
a controller with instructions stored in memory thereof that when executed cause the controller to adjust an operational state of the first motor and selectively couple the ring gear to a static housing via a clutch based on a speed of the planet carrier.

2. The electric driveline of claim 1, wherein a third output shaft is coupled to the planet carrier and to a gear of a drive axle.

3. The electric driveline of claim 2, wherein the third output shaft extends through the second output shaft.

4. The electric driveline of claim 1, wherein the planetary gear set is interposed between the first motor and the second motor.

5. The electric driveline of claim 1, wherein the first motor is an electric motor and the second motor is an electric motor.

6. The electric driveline of claim 1, wherein the instructions cause the controller to deactivate the first motor and close the clutch when the speed of the planet carrier is less than a threshold speed.

7. The electric driveline of claim 6, wherein only the second motor supplies power to the planetary gear set.

8. The electric driveline of claim 1, wherein the instructions cause the controller to maintain the first motor and the second motor active and open the clutch when the speed of the planet carrier is greater than a threshold speed.

9. The electric driveline of claim 8, wherein the planetary gear set blends power from the first motor and the second motor and supplies the blended power to a drive axle.

10. A system, comprising:
an intermediate planetary system (IPS) arranged between a first electric motor and a second electric motor, wherein a ring gear of the IPS is coupled to a first output shaft of the first electric motor and a sun gear of the IPS is coupled to a second output shaft of the second electric motor;
a clutch configured to couple the ring gear to a housing of the IPS; and
a controller configured to determine a total power demanded based on input power of the first electric motor and the second electric motor, and adjust operation of the first electric motor, the second electric motor, and the clutch in response to a comparison of the total power demanded to a threshold power.

11. The system of claim 10, further comprising a planet carrier coupled to each of the sun gear and the ring gear.

12. The system of claim 10, wherein the second output shaft is hollow, and wherein a third output shaft of the IPS extends through and is concentric with the second output shaft.

13. The system of claim 10, wherein the housing is stationary.

14. The system of claim 10, further comprising a third electric motor configured to power a pump of a hydraulic system coupled to the clutch.

15. A system for an electric driveline, comprising:
a first electric motor comprising a first output shaft;
a second electric motor comprising a second output shaft;
a planetary gear set arranged between the first electric motor and the second electric motor, the planetary gear set comprising a ring gear coupled to the first output shaft, a sun gear coupled to the second output shaft, and a planet carrier coupled to the ring gear and the sun gear, wherein the second output shaft is hollow, and wherein a third output shaft is coupled to the planet carrier and extends through the second output shaft toward a drive axle; and
a clutch configured to control a coupling between the ring gear and a static housing of the planetary gear set.

16. The system of claim 15, further comprising a controller configured to control a closing and opening of the clutch in response to a comparison of a speed of the planet carrier to a threshold speed.

17. The system of claim 16, wherein the controller is further configured to open the clutch in response to the speed of the planet carrier being greater than the threshold speed; and
close the clutch in response to the speed of the planet carrier being less than the threshold speed.

18. The system of claim 15, wherein the clutch is coupled to a hydraulic system pressurized by a pump driven by a third electric motor.

* * * * *